(12) United States Patent
Votoupal et al.

(10) Patent No.: US 8,013,470 B2
(45) Date of Patent: Sep. 6, 2011

(54) SYSTEM AND METHOD FOR SUPPLYING POWER TO A POWER GRID

(75) Inventors: John J. Votoupal, Hudson, IL (US); Robert C. Scott, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 149 days.

(21) Appl. No.: 12/419,586

(22) Filed: Apr. 7, 2009

(65) Prior Publication Data

US 2010/0253142 A1 Oct. 7, 2010

(51) Int. Cl.
 *H02J 1/10* (2006.01)
(52) U.S. Cl. .......................................... 307/43
(58) Field of Classification Search .............. 307/43, 307/80, 64–66; 700/286, 288, 295
See application file for complete search history.

(56) References Cited

U.S. PATENT DOCUMENTS

| | | |
|---|---|---|
| 5,434,020 A | 7/1995 | Cooper |
| 7,270,911 B2 * | 9/2007 | Clarke et al. ............. 429/105 |
| 7,590,472 B2 * | 9/2009 | Hakim et al. ............ 700/295 |
| 7,661,370 B2 * | 2/2010 | Pike et al. ................ 105/50 |
| 7,747,739 B2 * | 6/2010 | Bridges et al. ........... 709/224 |
| 7,752,145 B2 * | 7/2010 | Kelty ....................... 700/295 |
| 2008/0039980 A1 | 2/2008 | Pollack et al. |

OTHER PUBLICATIONS

Tahil, Zinc Air Battery and the Zinc Economy: A Virtuous Circle, 2007, 10 pages, Meridian International Research, France.
Oman, Converting Solar-Photovoltaic Power Into Exportable Products, 5 pages, USA.

* cited by examiner

*Primary Examiner* — Albert W Paladini
(74) *Attorney, Agent, or Firm* — Finnegan, Hendeson, Farabow, Garrett & Dunner LLP

(57) ABSTRACT

System and methods for supplying electric power to a power grid are disclosed. The system includes a power generation source, a charging station for charging a zinc-based energy storage device from the power generation source, and a transport module for transporting the zinc-based energy storage device. The system also includes an input station for supplying power to the power grid from the zinc-based energy storage device, and a controller for selectively discharging the zinc-based energy storage device to the power grid based on the initiation signal.

17 Claims, 3 Drawing Sheets

SYSTEM AND METHOD FOR SUPPLYING POWER TO A POWER GRID

TECHNICAL FIELD

This disclosure relates generally to a system and method for supplying power to a power grid. In particular, the disclosure relates to a system for supplying electric power from a zinc-based energy storage device.

BACKGROUND

Traditional methods of supplying electric power have drawbacks. First, environmental costs associated with fossil-fuel based electric power sources, such as coal, are drawing increasing concern. It is expensive to mitigate the environmental effects of these sources. Second, because fossil-fuel based sources are nonrenewable, scarcity will eventually result in higher costs for these sources unless aggregate demand for them is reduced.

Transmission of the electricity from the power generation source through the power grid to the point of end use is also a challenge. Transmission lines involve many costs, include fabricating the transmission equipment, installing the transmission lines on property above or below ground, and complying with myriad regulatory requirements. In addition, the time required to install transmission lines may reduce or eliminate the ability of the energy installation, such as a wind farm, to begin producing revenue.

In addition, the installation of a single transmission line often requires the coordination of multiple private entities and state and local governments. In addition, power loss associated with supplying electricity through the transmission line adds to the total cost. These factors constrain the location of power generation sources in relation to the points of end use.

Yet another challenge of traditional electric power supply lies in the variability of demand. Power systems must be built to handle large variability of demand, and to adequately supply power during periods of peak demand. For example, a warm summer afternoon on a weekday results in high demand for electricity, as residential, industrial, and commercial users of electricity all require relatively larger amounts of power at the same time. Traditional power grids lack energy storage capacity to store electricity to deal with variability of demand. Consequently, additional costs must be incurred to build extra power generating capacity than is needed on average, in order to ensure that capacity exists to meet demand at peak times.

Certain fossil fuel based power generation plants, such as coal-fired plants, often require a lead-time before fully coming online to deliver power to a power grid. This may be due to the need to prepare the power plant to deliver power. Therefore, in order to deliver power more quickly to a power grid when needed on short notice, a fossil-fuel power plant may burn fuel to remain in standby in order to quickly respond to changes in power demand. This adds to the total power generation cost and increases emissions.

Renewable electricity generation technologies are rapidly being developed to mitigate some of the above concerns. However, many renewable sources of energy (e.g., wind, tidal, and/or solar energy) are inherently intermittent. Thus, while renewable energy technologies address some of the problems of electric power generation, they also create additional problems. The variability in renewable power supply can lead to greater need to keep fossil-fuel based sources ready to provide incremental demand, which, as noted above, has both monetary and environmental costs.

Variability of supply, coupled with the costs and difficulty associated with building transmission lines, poses a particular challenge for wind energy. The best locations to site a wind turbine, containing the highest amount of consistent wind, are sometimes located far from the locations where the energy is to be used. The optimal generating sites may also be remote to existing transmission lines, necessitating the construction of additional new transmission infrastructure. Because there is a loss of electrical energy associated with transmission lines that may be proportional to the distance of the transmission line, the availability of new or existing transmission line capacity may compel the wind farm to be sited at a suboptimal location, where the variability of wind is a large economic concern. In addition, the timing of the availability of wind may not correlate to the time periods of peak demand for power use.

Methods and systems are being developed to address the dual variability in supply and demand for electricity from renewable sources. For example, there are various efforts aimed at storing solar or wind-generated electricity in energy storage devices, such as in underground compressed air tanks or in spinning flywheels. While these systems allow energy to be used at times of more optimal demand than at the time of power generation, these methods still require a full transmission line infrastructure in place to transport the energy to the power grid and ultimately to end users.

The present disclosure is directed to overcoming or mitigating one or more of the problems set forth above.

SUMMARY OF THE INVENTION

In one embodiment of the present disclosure, a method for supplying electric power to a power grid is disclosed. The method includes the steps of charging a zinc-based energy storage device, and transporting the zinc-based energy storage device to a power grid entry location. The method includes the further steps of receiving an initiation signal to supply power to the power grid and discharging the zinc-based energy storage device into the power grid at the power grid entry location based on the initiation signal.

In another embodiment of the present disclosure, a method for supplying electric power to a power grid is disclosed. The method includes the steps of receiving an indication of power demand, and receiving a zinc-based energy storage device at a power grid input location. The method includes the further steps of calculating an initiation time for supplying power in response to the indication of power demand, and supplying power from the zinc-based energy storage device on or after the initiation time.

In yet another embodiment of the present disclosure, a system for supplying electric power to a power grid is disclosed. The system includes a power generation source, a charging station for charging a zinc-based energy storage device from the power generation source, and a transport module for transporting the zinc-based energy storage device. The system also includes an input station for supplying power to the power grid from the zinc-based energy storage device, and a controller for selectively discharging the zinc-based energy storage device to the power grid.

DETAILED DESCRIPTION

Figure 1:
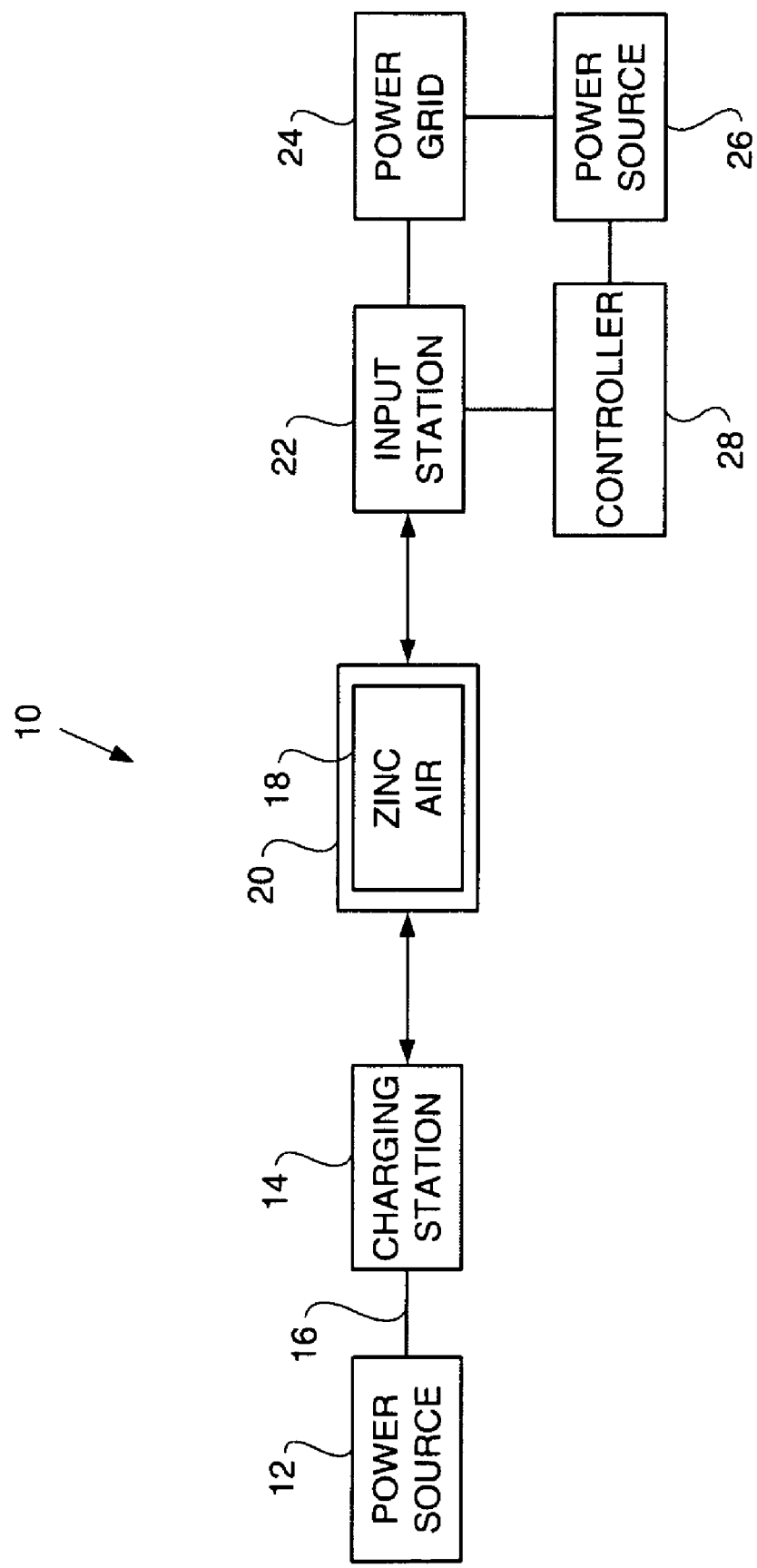
FIG. 1 is a schematic illustration of a system in accordance with an embodiment of the present disclosure.

FIG. 1 shows an exemplary system 10 for supplying power to a power grid. System 10 may include a power generation source 12 for generating electric power. Power generation source 12 may be a wind turbine or wind farm, a photovoltaic array, a solar thermal power plant, or similar power generation source. Preferably, power generation source 12 generates power from renewable energy.

Power generation source 12 is electrically connected to charging station 14, wherein power generation source 12 supplies energy to electrochemically charge zinc-based energy storage device 18. Charging station 14 is preferably located geographically at or near power generation source 12, although charging station 14 may be geographically separated from power generation source 12 by electrical transmission lines. In FIG. 1, charging station is connected to power generation source 12 by transmission line 16. If charging station 14 is located at or near power generation source 12, transmission line 16 may not be necessary.

Charging station 14 includes infrastructure to provide energy to zinc-based energy storage device 18. Zinc-based energy storage device 18 is composed of one or more "zinc-air" batteries, which are known in the art. Zinc-air batteries release power by the oxidation of zinc. This can be explained with reference to the following reaction:

Anode: $Zn+2OH^- \rightarrow Zn(OH)_2+2e^-$
Cathode: $O_2+2H_2O+4e^- \rightarrow 4OH^-$
Overall: $2Zn+O_2+2H_2O \rightarrow 2Zn(OH)_2$ There are many advantages of using zinc-air batteries for zinc-based energy storage device 18 in connection with the present disclosure. Zinc-air batteries have high energy density (or specific energy), which means that more energy may be stored per unit weight of material. In addition, zinc is a common metal, thus making it a more attractive energy storage material relative to scarcer materials. The zinc is also reusable.

Returning to FIG. 1, transport module 20 stores zinc-based energy storage device 18 for transport from charging station 14 to input station 22. Transport module 20 is a container suitable for use in, for example, a commercial truck, a railcar, a container vessel, or like means of transport. Volume and weight restrictions of these methods of transportation may naturally limit the size and weight of transport module 20 and, likewise, zinc-based energy storage device 18. However, zinc-based energy storage device 18 may nonetheless remain of a size so as to store and transport a considerable amount of electric power in a single transport module 20.

Transport module 20 is transported from charging station 14 to an input station 22. Input station 22 contains infrastructure to electrochemically discharge zinc-based energy storage device 18 into a power grid 24. Power grid 24 may then distribute the power provided from zinc-based energy storage device 18 to end users based on traditional power distribution methods.

FIG. 1 also shows a power source 26, which is optionally part of system 10, and is configured to provide power to power grid 24. If power grid 24 requires additional power, for example, in response to increased demand for electric power at a particular time, power source 26 may receive a signal from controller 28 whether to prepare to supply to power, to supply power, or to remain offline. Power source 26 may be a traditional fossil fuel based power plant, such as a coal plant. The system of FIG. 1 is advantageous because it reduces the time in which power source 26 must burn fuel in a standby mode in order to quickly supply power to power grid 24 in response to demand. Because some or all of power demand may be supplied to power grid 24 from one or more zinc-based energy storage devices 18 for a period of time, this lessens or eliminates the need for power source 26 to remain in a standby mode ready to produce power.

Controller 28 may monitor present demand for power in power grid 24. Controller 28 may also estimate demand for power in power grid 24 at a particular future time. If controller 28 calculates that power grid 24 requires, or will require, additional electric power, controller 28 can direct the input of power into power grid 24 from zinc-based energy storage device 18 to fulfill demand. This allows power grid 24 to receive power to meet at least some demand without necessarily requiring power source 26 to burn fuel in a standby mode. Controller 28 may calculate the amount of power available from one or more zinc-based energy storage devices 18, and may calculate a time to send a signal to power source 26 to prepare to supply power and/or to supply power, based on the present and estimated future demand for power from power grid 24, and the present and estimated future available power from zinc-based energy storage devices 18 input into power grid 24 at input station 22.

Controller 28 may also receive information indicative of the availability of power from power generation source 12. This is particularly useful if power generation source 12 is an intermittent energy source, such as a wind turbine or solar array. Controller 28 may send instructions to set a rate of charge of one or more zinc-based energy storage devices 18 at charging station 14.

System 10 may be configured to charge, transport, and discharge a zinc-based energy storage device 18 without regard to factors such as the spot price of electricity, or the status of other elements in system 10. In other words, system 10 can deliver power based on the physical rate at which one or more zinc-based energy storage devices 18 may be charged, transported, and discharged into power grid 24.

Figure 2:
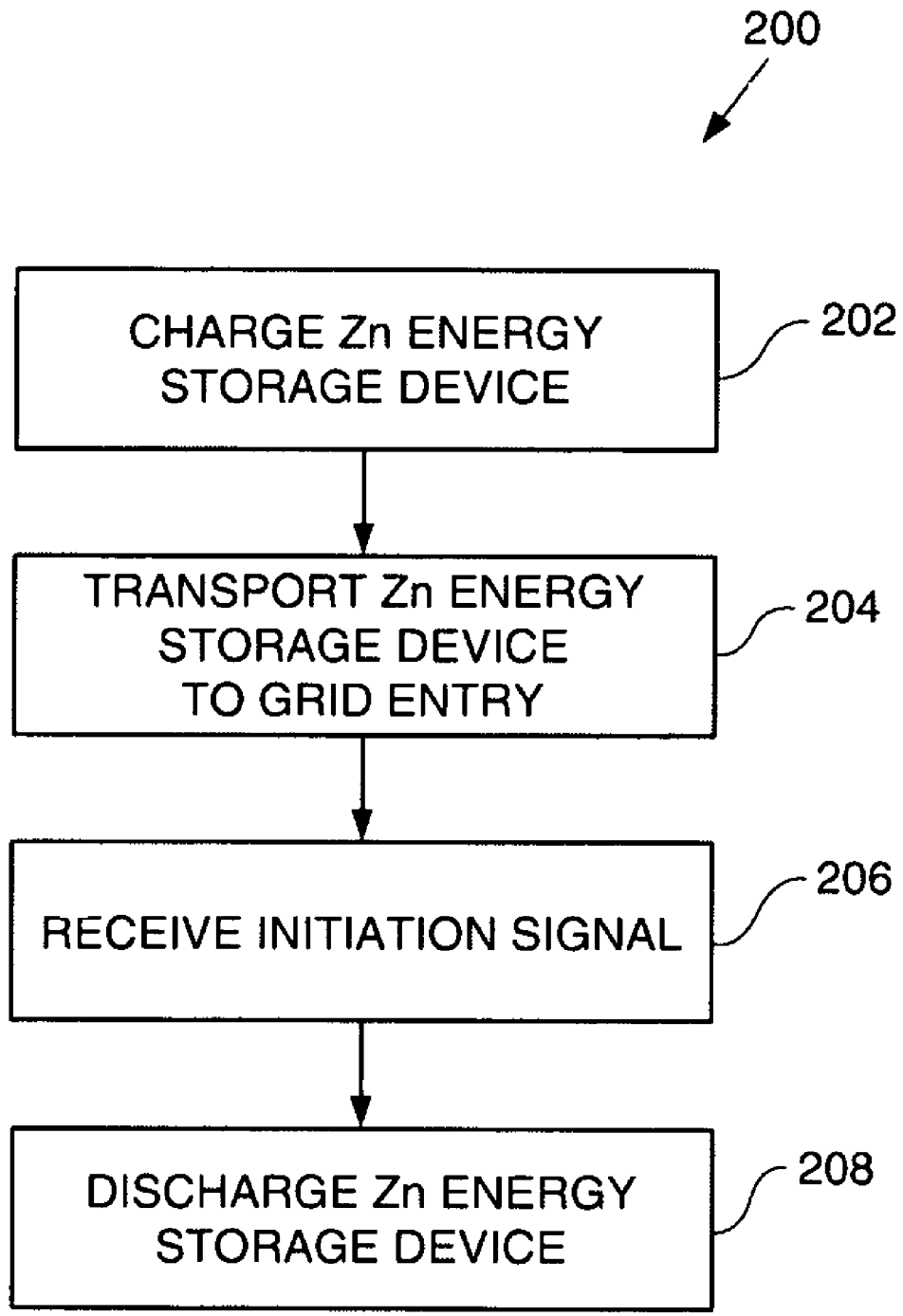
FIG. 2 is a flow diagram of a method in accordance with an embodiment of the present disclosure.

FIG. 2 shows a flow diagram of a method 200 in accordance with an embodiment of the present disclosure. Method 200 includes charging a zinc-based energy storage device, step 202. As discussed in relation to the embodiment of FIG. 1, methods to charge a zinc-based energy storage device, containing one or more zinc-air batteries, are known in the art.

Method 200 may also include the step of transporting the zinc-based energy storage device to a power grid entry location, step 204. The zinc-based energy storage is transported by methods including, for example, by truck, railcar, barge and/or other container ships. For example, one or more zinc-based energy storage devices are placed in a standard multi-modal container for easy transport on standard commercial trucks, railcars, and/or container ships.

The transporting step 204 in method 200, using a physical container, is not necessarily the sole method of transporting electrical energy from a power generation source to a grid entry location on the power grid. In other words, a power generation source may be connected to a transmission line to a charging station, where the zinc-based energy storage device is charged. Then the zinc-based energy storage device is transported according to step 204 to a grid entry location, where the energy is again carried by transmission line through the power grid to end users. Step 204 does not exclude the use of transmission lines to partially carry electric power from the power generation source to the end user.

Method 200 also includes step 206, receiving an initiation signal to supply power to the power grid. This is a signal to discharge one or more zinc-based energy storage devices into the power grid at a present or future time. This signal may be based at least in part on the amount of power available to the power grid. For example, if demand for power in the power grid exceeds a certain threshold (e.g., the amount of base load power available from power generation sources), then an initiation signal may specify an appropriate time to discharge one or more zinc-based energy storage devices in to the grid. Thus, the initiation signal may help "peak shave" demand.

The initiation signal may also be based at least in part on the spot price of electricity. For example, the zinc-based energy storage devices may be stored until the spot price of electricity rises above a threshold price, whereby the zinc-based energy storage devices are then discharged to the power grid. The initiation signal may also be based in part on the inventory of available zinc-based energy storage devices available for discharge. In addition, the initiation signal may be also based in part on a prediction of availability of power from power generation sources. For example, if a wind energy facility is predicted to have less available wind, the initiation signal may be based in part on the demand for power from the power grid at the time when the available wind energy is predicted to fall below a certain threshold.

The final step shown in FIG. 2 is the step of discharging the zinc-based energy storage device into the power grid at the power grid entry location, step 208. As with the charging step, methods to discharge the electrical energy from zinc air batteries are known in the art. Although step 208 is the final step in the method, steps 202, 204, and 206 may occur in different order than that shown in FIG. 2. For example, step 206 can precede steps 202 and 204.

Figure 3:
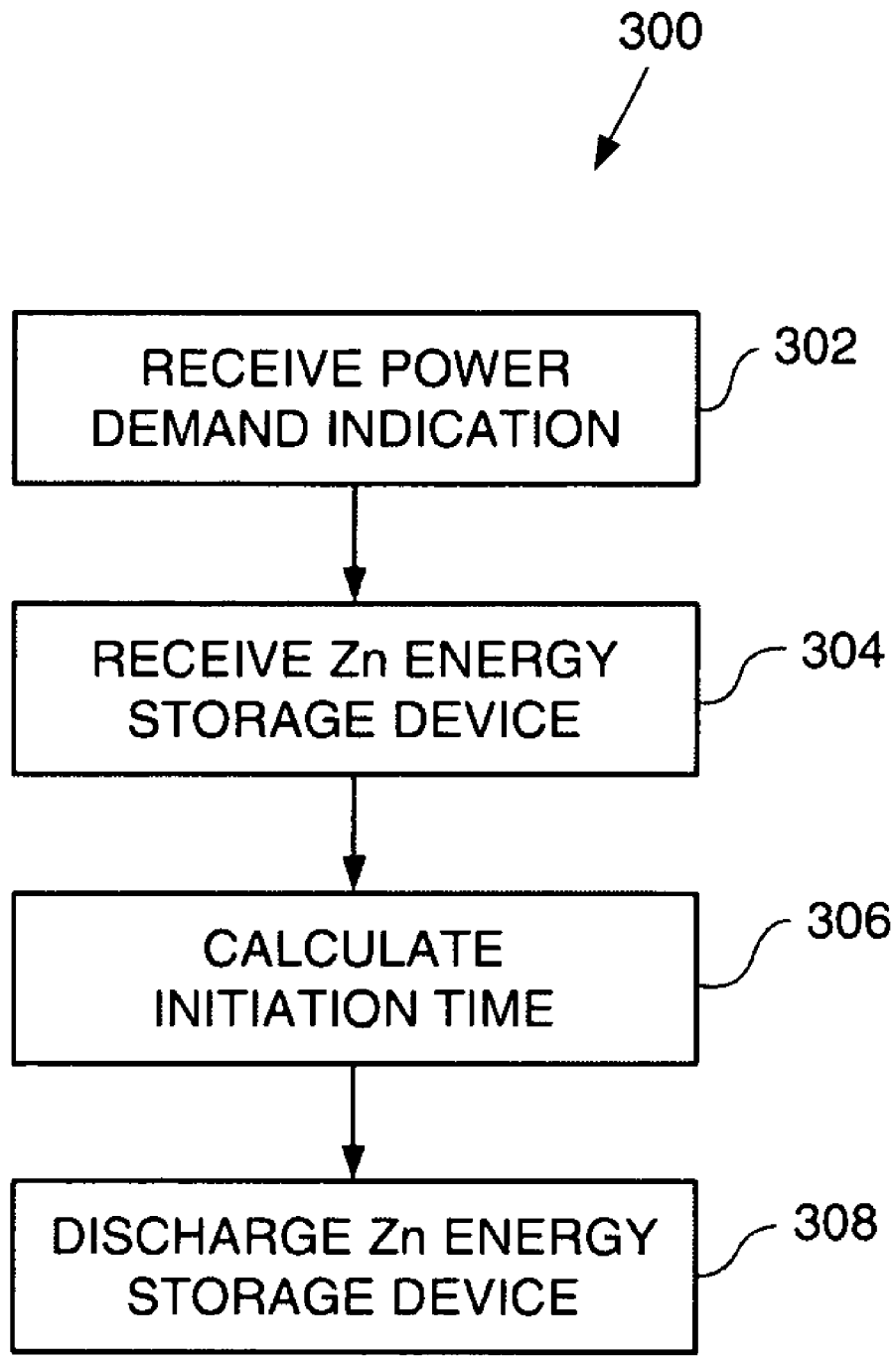
FIG. 3 is a flow diagram of a method in accordance with an embodiment of the present disclosure.

FIG. 3 shows a flow diagram of a method 300 in accordance with an embodiment of the present disclosure. Step 302 recites receiving an indication of power demand. For example, the power grid may require more electrical power in response to a number of conditions: more users, more demand per user, the loss of one or more power generation sources (e.g., loss of wind at a wind energy installation, unexpected repairs at a power plant, etc.). The next step, 304, is receiving a zinc-based energy storage device at a power grid input location. This step may be accomplished via transport methods discussed earlier.

The next step, step 306 (which may precede step 304) is calculating an initiation time for supplying power in response to the indication of power demand. This calculation may be based at least in part on the amount of power available to the power grid, the spot price of electricity (or estimated future spot price at a given time), and/or on the inventory of available zinc-based energy storage devices available for discharge.

FIG. 3 recites the final step in method 300, supplying power from the zinc-based energy storage device in response to the indication of power demand, step 308. As previously noted, methods discharge a zinc-based energy storage device are well known.

INDUSTRIAL APPLICABILITY

The present disclosure provides advantageous systems and methods for supplying power to a power grid. The disclosed systems and methods are advantageous in mitigating or eliminating current drawbacks in traditional methods of supplying electric power to end users. In particular, the disclosed systems and methods mitigate the time and costs to build transmission lines to power generation sites, and address the variability of power supply of renewable energy sources, as well as mitigate costs involved with variability of power demand from a power grid.

Other embodiments, features, aspects, and principles of the disclosed examples will be apparent to those skilled in the art and may be implemented in various environments and systems.

LIST OF ELEMENTS

Title: System and Method for Supplying Power to a Power Grid
File: 08-1077
10 system
12 power generation source
14 charging station
16 transmission line
18 zinc-based energy storage device
20 transport module
22 input station
24 power grid
26 power generation source
28 controller
200 method
202 charge Zn energy storage device
204 transport Zn energy storage device to grid entry
206 receive initiation signal
208 discharge Zn energy storage device
300 method
302 receive power demand indication
304 receive Zn energy storage device
306 calculate initiation time
308 discharge Zn energy storage device

What is claimed is:

1. A method for supplying electric power to a power grid, comprising:
    charging a zinc-based energy storage device;
    transporting the zinc-based energy storage device to a power grid entry location after the charging;
    receiving an initiation signal to supply power from the zinc-based energy storage device to the power grid; and
    discharging the zinc-based energy storage device into the power grid at the power grid entry location based on the initiation signal.

2. The method of claim 1, including the step of generating power at a first location.

3. The method of claim 2, wherein the step of charging a zinc-based energy storage device occurs at the first location.

4. The method of claim 1, wherein the initiation signal is based at least in part on the amount of power available to the power grid.

5. The method of claim 1, wherein the initiation signal is based at least in part on a spot price of electricity.

6. The method of claim 1, wherein the initiation signal is based at least in part on inventory of available zinc-based energy storage devices at the power grid entry location.

7. A method for supplying electric power to a power grid, comprising:
    charging a zinc-based energy storage device;
    receiving an indication of power demand;
    receiving the zinc-based energy storage device at a power grid input location after the charging;
    calculating an initiation time for supplying power from the zinc-based energy storage device to the power grid in response to the indication of power demand; and
    supplying power from the zinc-based energy storage device on or after the initiation time.

8. The method of claim 7, including the step of preparing to supply power from a fossil fuel-based energy source.

9. The method of claim 7, including the step of predicting available power to the power grid based on availability of at least one energy source.

10. The method of claim 9, wherein the at least one energy source is a wind energy source.

11. The method of claim 7, further including the step of predicting the spot price of electricity at the initiation time.

12. A system for supplying electric power to a power grid, comprising:
- a power generation source;
- a charging station for charging a zinc-based energy storage device from the power generation source;
- a transport module for transporting the charged zinc-based energy storage device;
- an input station for supplying power to the power grid from the zinc-based energy storage device; and
- a controller for selectively discharging the zinc-based energy storage device to the power grid.

13. The system of claim 12, wherein the transport module for transporting the zinc-based energy storage device includes at least one of: a multimodal container, a commercial truck, or a railcar.

14. The system of claim 12, including a controller for directing the transport module for transporting the zinc-based energy storage device.

15. The system of claim 12, wherein the controller directs the input of power to the power grid based on the spot price of electricity.

16. The system of claim 14, wherein the controller for the input station for supplying power to a power grid from the zinc-based energy storage device directs the input of power to the power grid based on a calculation of demand for electric power.

17. The system of claim 14, wherein the controller for the input station for supplying power to a power grid from the zinc-based energy storage device directs the input of power to the power grid based on a calculation of supply of electric power at the power generation source.

* * * * *